United States Patent
Yokomizo (10) Patent No.: US 12,143,602 B2
(45) Date of Patent: Nov. 12, 2024

(54) INFORMATION PROCESSING APPARATUS, CONTROL METHOD, STORAGE MEDIUM, AND INFORMATION PROCESSING SYSTEM

(71) Applicant: CANON KABUSHIKI KAISHA, Tokyo (JP)

(72) Inventor: Tsuyoshi Yokomizo, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/746,116

(22) Filed: May 17, 2022

(65) Prior Publication Data
US 2022/0385921 A1 Dec. 1, 2022

(30) Foreign Application Priority Data
Jun. 1, 2021 (JP) ................. 2021-092420

(51) Int. Cl.
*H04N 19/167* (2014.01)
*H04N 19/159* (2014.01)
*H04N 19/17* (2014.01)

(52) U.S. Cl.
CPC ......... *H04N 19/167* (2014.11); *H04N 19/159* (2014.11); *H04N 19/17* (2014.11)

(58) Field of Classification Search
CPC .... H04N 19/167; H04N 19/159; H04N 19/17; H04N 21/4223; H04N 19/162; H04N 19/33; H04N 21/4728
See application file for complete search history.

(56) References Cited

U.S. PATENT DOCUMENTS

| 10,229,478 B2* | 3/2019 | Prasad ................. G06F 3/0486 |
| 10,848,685 B2 | 11/2020 | Yokomizo |
| 2011/0267502 A1* | 11/2011 | Tang ..................... H04N 19/46 |
| | | 348/222.1 |

(Continued)

FOREIGN PATENT DOCUMENTS

| CN | 107087212 A | * 8/2017 | .......... H04N 19/167 |
| JP | 2004032105 A | * 1/2004 | |

(Continued)

*Primary Examiner* — Dramos Kalapodas
(74) *Attorney, Agent, or Firm* — Carter, DeLuca & Farrell LLP (57) ABSTRACT

An information processing apparatus that communicates with a storage device that stores, at a plurality of resolutions, tile images obtained by dividing a picked-up image into a plurality of predetermined regions and to which encoding processing including intra-frame encoding and inter-frame encoding has been performed comprises: a designation unit for designating a predetermined region of the picked-up image for a preset tour in advance; a request unit for requesting the storage device to transmit the tile image including the predetermined region with higher resolution from among the plurality of resolutions; and a display control unit for cutting out the predetermined region from the tile image and cause a display unit to display the cut-out predetermined region, wherein, when the predetermined region is designated in advance, wherein, when the predetermined region is designated in advance, the request unit requests the storage device to transmit the tile image including the predetermined region.

12 Claims, 10 Drawing Sheets

(56) References Cited

U.S. PATENT DOCUMENTS

| | | |
|---|---|---|
| 2014/0355015 A1 | 12/2014 | Yokomizo |
| 2015/0201198 A1* | 7/2015 | Marlatt ............... H04N 19/124 375/240.03 |
| 2016/0165309 A1* | 6/2016 | Van Brandenburg ....................... H04N 21/64322 725/116 |

FOREIGN PATENT DOCUMENTS

| JP | 2004214985 A | * | 7/2004 |
| JP | 2014185882 A | * | 10/2014 |
| JP | 2016058994 A | * | 4/2016 |

* cited by examiner

INFORMATION PROCESSING APPARATUS, CONTROL METHOD, STORAGE MEDIUM, AND INFORMATION PROCESSING SYSTEM

BACKGROUND OF THE INVENTION

Field of the Invention

The present invention relates to an information processing apparatus, a control method, a storage medium, and an image processing system and the like.

Description of the Related Art

Advances in network technology increase the opportunities for users to remotely view video images provided by image pickup apparatuses such as network cameras. In addition, there are services where a user can freely views a region of interest by designating the region of interest to be gazed at from images taken by a camera, digitally cutting out the region of interest on the client device side, and performing enlargement/reduction and the like of the cut-out region of interest for display.

However, when the region of interest is cut out on the client device side and enlarged for display, effective resolution of the video image lowers, and the video image is viewed as if the quality thereof has degraded. In order to overcome this drawback, for example, the whole video image (whole image) of the picked-up video image (picked-up image) and each tile video image group obtained by dividing the high-resolution picked-up video image into a plurality of predetermined regions (tiles) are transmitted to a recording server. Additionally, a technique for performing high scalability and bandwidth management by transmitting a tile video image (tile image) that is closest to the region of interest designated by the user to a client device is known.

For example, in Japanese Patent Publication Laid-Open No. 2016-058994, a monitoring camera generates both high-resolution video image data and low-resolution video image data based on the same video signal during image pickup and records both the video image data in a recording device. Japanese Patent Application Laid-Open Publication No. 2016-058994 discloses a technique in which, during video image recording, low-resolution video image data are distributed when a whole video image is viewed, and when the user requests a cut-out video image, the video image data to be distributed are switched to a video image that has been cut out from the high-resolution video image data.

Additionally, a digital PT (panning and tilting) movement technique for moving the position of the cut-out video image in the panning and tilting directions is also generally known. For example, when digital PT movement is performed for a video image that has been cut out from a tile of a high-resolution video image, there may be cases in which switching to a tile of a different high-resolution video image is required.

Additionally, a preset function for registering the position of the cut-out video image in advance is known. Further, a function for sequentially touring preset positions at fixed intervals if a plurality of preset positions exist is known, and the function is referred to as a "preset tour function".

However, for the output from the image pickup apparatus, a compression method in which intra-frame compression and inter-frame compression are combined, for example, H.264, is often used in order to ensure a high compression ratio. Therefore, when the video images are switched, the video images cannot be switched until the intra-frame compression to the frame of the video image is completed, so that the user needs to wait for the completion of the intra-frame compression for the frame of the video image.

In particular, when digital PT movement is executed by the preset function or the like, video images are frequently switched, and the time for awaiting the intra-frame compression to the frame of the video image may increase. Furthermore, the movement between a plurality of preset positions in a short stop time using the preset tour function needs the movement between the preset positions prior to receiving the frame for which intra-frame compression has been performed, and as a result, the quick display of the image after preset movement may not be possible.

SUMMARY OF THE INVENTION

The object of the present invention is to quickly display a high-resolution image when an image to be displayed on a display unit is switched to an image of a region designated in advance.

In order to solve the above drawback, an information processing apparatus of one aspect of the present invention can communicate with a storage device that stores, at a plurality of resolutions, tile images obtained by dividing a picked-up image into a plurality of predetermined regions and to which encoding processing including intra-frame encoding and inter-frame encoding has been performed, the information processing apparatus comprising:
  at least one processor or circuit configured to function as:
    a designation unit configured to designate a predetermined region of the picked-up image for a preset tour in advance;
    a request unit configured to request the transmission of a tile image including the predetermined region with a higher resolution from among the plurality of resolutions from the storage device; and
    a display control unit configured to cut out the predetermined region from the tile image and cause a display unit to display the cut-out predetermined region,
  wherein, when the predetermined region is designated in advance, the request unit requests the storage device to transmit the tile image including the predetermined region.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

A configuration of the first embodiment will now be described in detail with reference to the accompanying drawings. First, a description will be given of a drawback when digital PT movement in an image pickup system that performs high scalability and bandwidth management, with reference to FIG. 1, FIG. 2, FIG. 3, and FIG. 4.

Figure 1A:
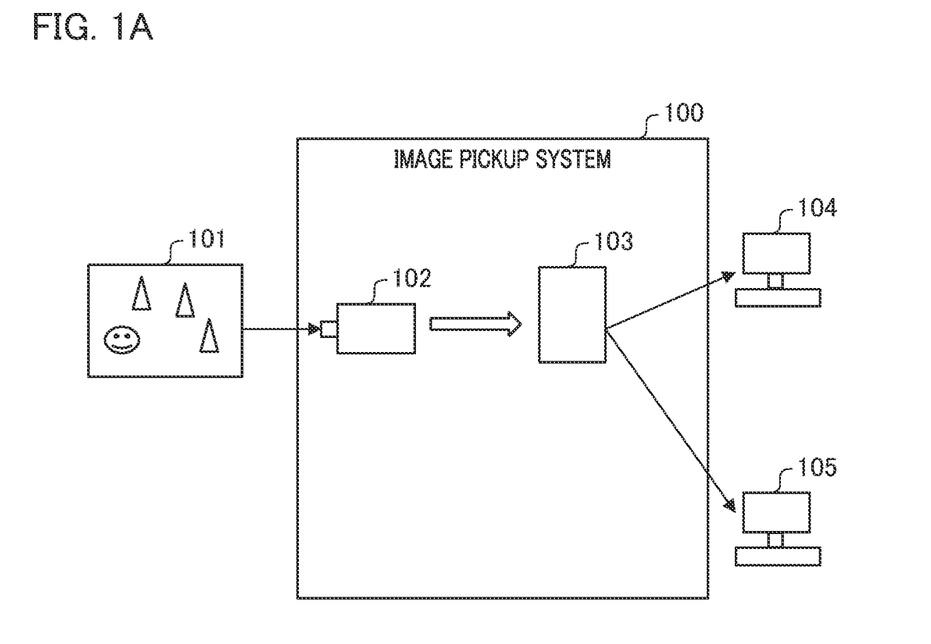
FIGS. 1A and 1B illustrate an image pickup system according to the first embodiment.
Figure 1B:
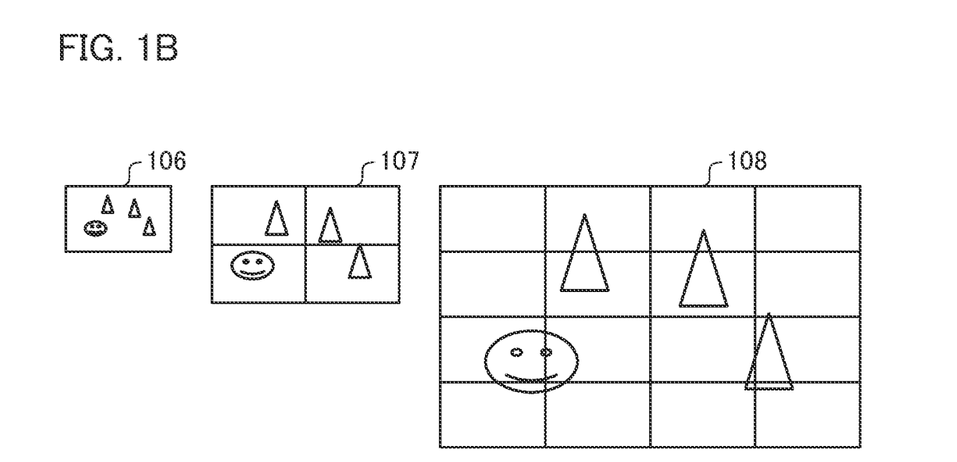
Figure 2:
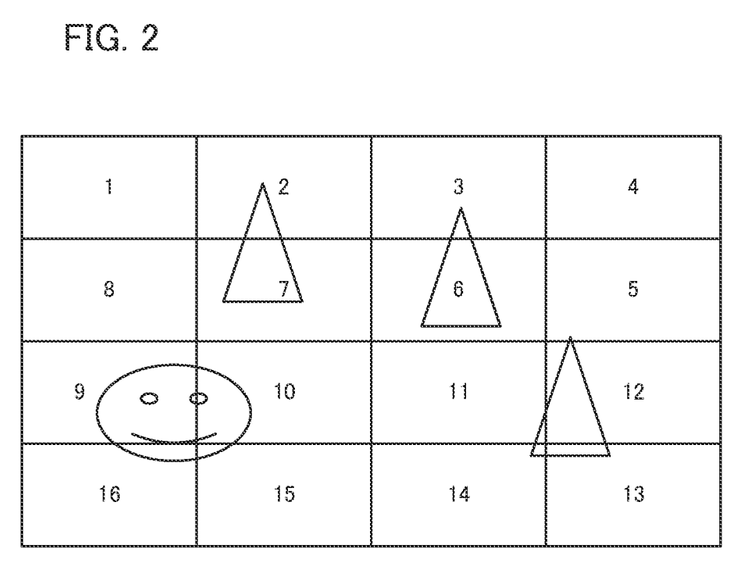
FIG. 2 illustrates an example of tile division of a video image generated by an image pickup apparatus according to the first embodiment.

FIG. 1 illustrates an image pickup system 100 according to the first embodiment. FIG. 1A is a conceptual diagram showing an example of a configuration of the image pickup system 100 that performs high scalability and bandwidth management. FIG. 1B is an example of a group of tile images to be transmitted from an image pickup apparatus 102 to a recording server 103 serving as a storage device. FIG. 2 illustrates an example of tile division for a video image generated by the image pickup apparatus 102 according to the first embodiment. The recording server is a form of the storage devices, and any type of storage device may be used if the storage device can store images.

The image pickup system 100 includes the image pickup apparatus 102 and the recording server 103 and distributes a photo-scene 101 to a client 104 and a client 105 operated by a user. Although the clients are located outside the image pickup system 100, they may be incorporated inside the image pickup system 100. Although, here, the number of the clients is two for convenience' sake of explanation, it may be one, two or more.

The image pickup apparatus 102 picks up the image of the photo-scene 101, generates video images (images) having a plurality of resolutions, and transmits them to the recording server 103. The images generated by the image pickup apparatus 102 serve as, for example, an image 106 having a low resolution, an image 107 having a medium resolution, which is higher than the image 106, and an image 108 having a higher resolution than the image 107.

Here, the image 106 having the lowest resolution serves the image of a layer 1 and the image 107 having the medium resolution serves as the image of a layer 2, that is, the number of layers increases as the resolution of the picked-up image increases. The image of the layer 2 is divided into, for example, four regions (tiles) and video images are created for each of the divided images (tile image or tile video image).

Similarly, in the image of a layer 3, the image is divided into, for example, 16 regions and video images are created for each of the divided images. Subsequently, each video image is compressed by a compressor that performs intra-frame compression (intra-frame coding) and inter-frame compression (inter-frame coding, also referred to as "inter-frame predictive coding"), for example, H. 264 and the compressed video images are transmitted to the recording server 103. Here, when the maximum layer number is 3 and the number of divisions in the layer i is "ni", n2=4 and n3=16 are established. However, this is for simplicity of explanation, and any number may be used as the maximum layer number and the number of divisions in each layer.

Additionally, here, when the number of layers to which the video image belongs is denoted by "i" and the number of tiles of the video image is denoted by "j", the video image generated by the image pickup apparatus 102 is denoted by "Aij". Here, as shown in FIG. 2, for example, the tile number "1" is assigned to the upper left to serve as the starting point and the next number is applied to the tile to the right. If no tile exists to the right, the next number may be applied to the tile to the bottom of the tile by turning back. Subsequently, the recording server 103 receives and records Σini video images in total.

Figure 3:
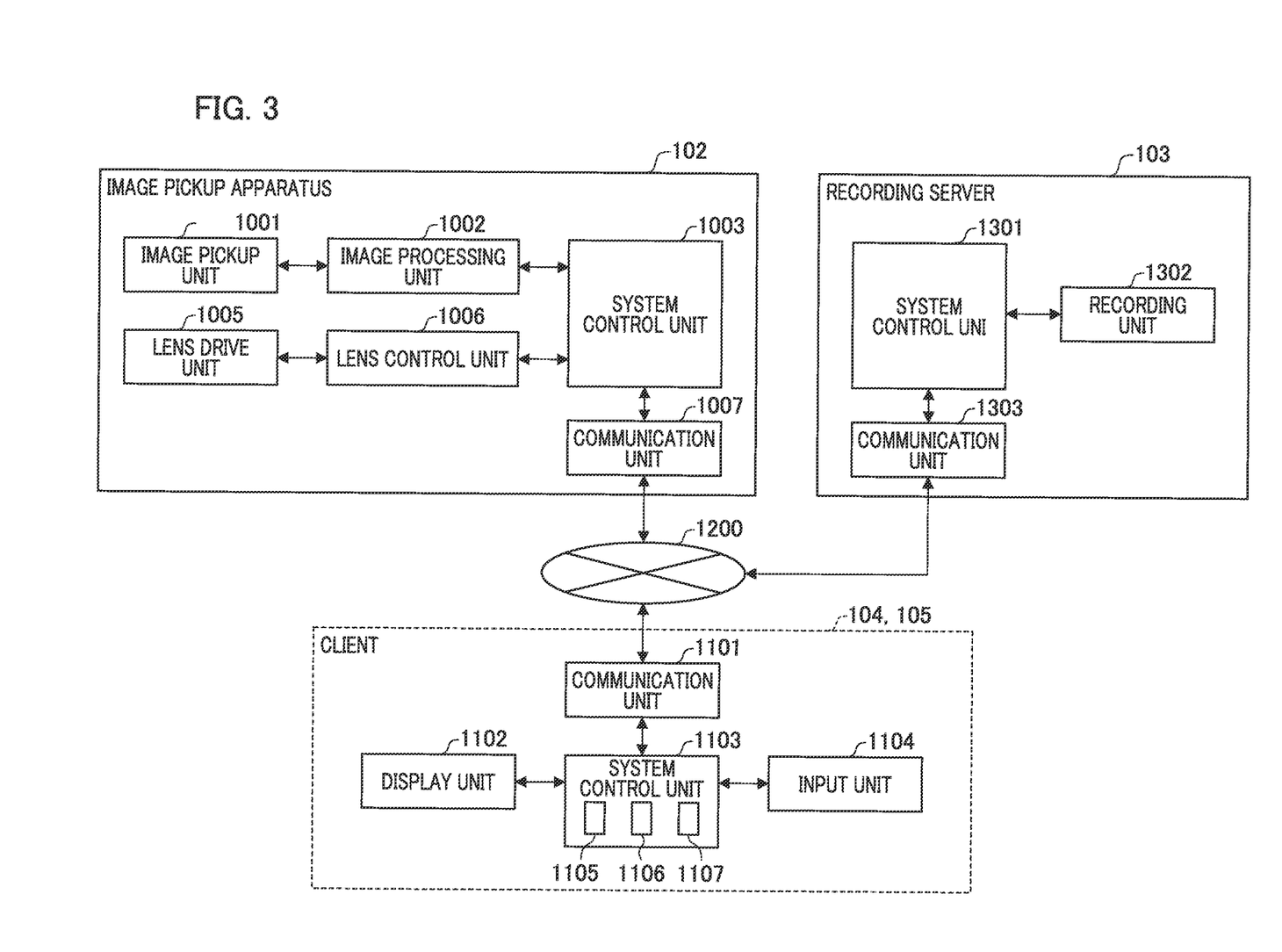
FIG. 3 is a system configuration diagram of the image pickup apparatus, a recording server, and a video image display apparatus serving as a client according to the first embodiment.

FIG. 3 is a system configuration diagram of the image pickup apparatus 102, the recording server 103, and a video image display apparatus (information processing apparatus) serving as clients according to the present embodiment. Note that each block in the drawing is realized by a computer (CPU) (not illustrated) serving as a control unit that is built in each of the image pickup apparatus 102, the recording server 103, and the clients 104 and 105. Each block is realized by a computer executing a computer program stored in a memory.

In FIG. 3, reference numeral 102 denotes an image pickup apparatus, reference numeral 103 denotes a recording server, reference numerals 104 and 105 denote clients, and the reference numeral 1200 denotes a network. Additionally, reference numeral 1001 denotes an image pickup unit, reference numeral 1002 denotes an image processing unit, reference numeral 1003 denotes a system control unit, reference numeral 1005 denotes a lens drive unit, reference numeral 1006 denotes a lens control unit, and reference numeral 1007 denotes a communication unit.

Additionally, reference numeral 1301 denotes a system control unit of the recording server, reference numeral 1302 denotes a recording unit, and reference numeral 1303 denotes a communication unit. The image pickup apparatus 102, the recording server 103, and the clients 104 and 105 are connected to each other in a communicable state via the network 1200.

The configurations and functions of each unit of the image pickup apparatus 102 will be described with reference to FIG. 3. The image pickup unit 1001 includes an image pickup element and performs image pickup for an object and conversion to an electric signal.

The image processing unit 1002 performs predetermined image processing for signals obtained by photoelectrically conversion of an picked-up image by the image pickup unit 1001, generation of video image data having a plurality of resolutions, tile division, and compression encoding processing.

The lens drive unit 1005 drives a lens (optical element) of the image pickup apparatus 102 based on the control of the lens control unit 1006, and performs, for example, zoom adjustment.

The system control unit 1003 analyzes a camera control command and performs processing according to the command. For example, when receiving a zoom value change command for the lens from the recording server 103, the system control unit 1003 instructs the lens control unit 1006 to change the zoom value and zoom driving for the lens is performed through the lens drive unit 1005.

The communication unit 1007 distributes a plurality of tile video images (tile images) to the recording server 103 via the network 1200. The communication unit 1007 also receives various commands transmitted from the recording server 103 or the clients 104 and 105 and transmits them to the system control unit 1003.

Next, the configurations and functions of each unit of the recording server 103 will be described with reference to FIG. 3. When receiving tile video images having a plurality of resolutions from the image pickup apparatus 102 via a communication unit 1303, the system control unit 1301 instructs the recording unit 1302 to store the data.

The recording unit 1302 holds (stores) the video image data received from the image pickup apparatus as recorded video data upon being instructed to store the data from the system control unit 1301. Additionally, the recording unit 1302 transmits the recorded video images to the system control unit 1301 upon being instructed to extract (output) the recorded video images from the system control unit 1301.

Additionally, upon receipt of an instruction to transmit the tile video images from the clients 104 and 105 via the communication unit 1303, the system control unit 1301 instructs the recording unit 1302 to extract the designated tile video images. Subsequently, the system control unit 1301 transmits the obtained tile video images to the clients 104 and 105 via the communication unit 1303.

Next, a description will be given of a configurations and a function of each unit of the clients 104 and 105, with reference to FIG. 3.

Although information processing apparatuses, which are general-purpose computers such as a personal computer, are typically used as the clients 104 and 105, portable terminals such as a smartphone may also be used.

A communication unit 1101 receives various types of data that have been distributed from the recording server 103. The various types of data mainly include data representing a set value of the camera and video image data.

A liquid crystal display device or the like is used as a display unit 1102, and the display unit 1102 displays a graphic user interface (hereinafter, referred to as "GUI") for displaying images that have been obtained from the recording server 103 and for performing camera control.

A system control unit 1103 controls each unit of the clients 104 and 105 and may include a display control unit 1105, a request unit 1106, and a designation unit 1107. The display control unit 1105 causes the display unit 1102 to display video image data that have been received from the recording server 103 via the communication unit 1101. The display control unit 1105 can also display an operation screen including a GUI on the display unit 1102. The designation unit 1107 designates and cancels a region of interest according to an instruction from the user.

In this context, the region of interest is a region designated by the user and can also be referred to as a "predetermined region". The request unit 1106 requests the recording server 103 to transmit an appropriate tile video image and stop the transmission. Additionally, the system control unit 1103 generates a camera control command according to GUI operations by the user and transmits the camera control command to the recording server 103 or the image pickup apparatus 102 via the communication unit 1101.

Pointing devices such as a keyboard and a mouse are used as an input unit 1104, and the user operates GUI through the input unit 1104. Note that, in portable terminals, a touch panel, various key buttons and the like may be used as the input unit 1104.

Thus, the clients 104 and 105 can obtain the tile video images in the recording server 103 and perform camera control of the image pickup apparatus 102 via the network 1200.

Next, a description will be given of tile video images to be transmitted from the recording server 103 to the client 104 when digital PT movement due to preset movement or the like is performed, with reference to FIG. 3, FIG. 4, and FIG. 5.

Figure 4:
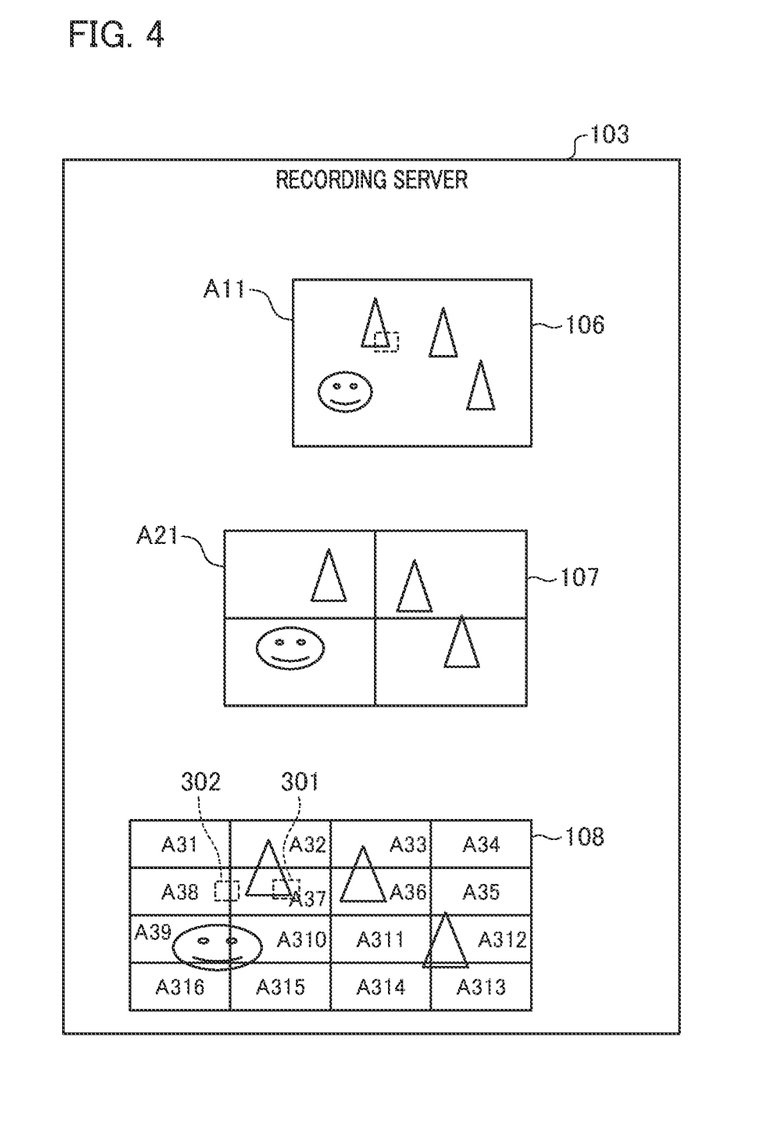
FIG. 4 illustrates an example of a group of tile video images stored in the recording server according to the first embodiment.

FIG. 4 illustrates an example of tile video image groups stored in the recording server 103 according to the first embodiment. Here, it is assumed that the tile video image groups of the layers 1 to 3 are held in the same format as in FIG. 1B.

Figure 5:
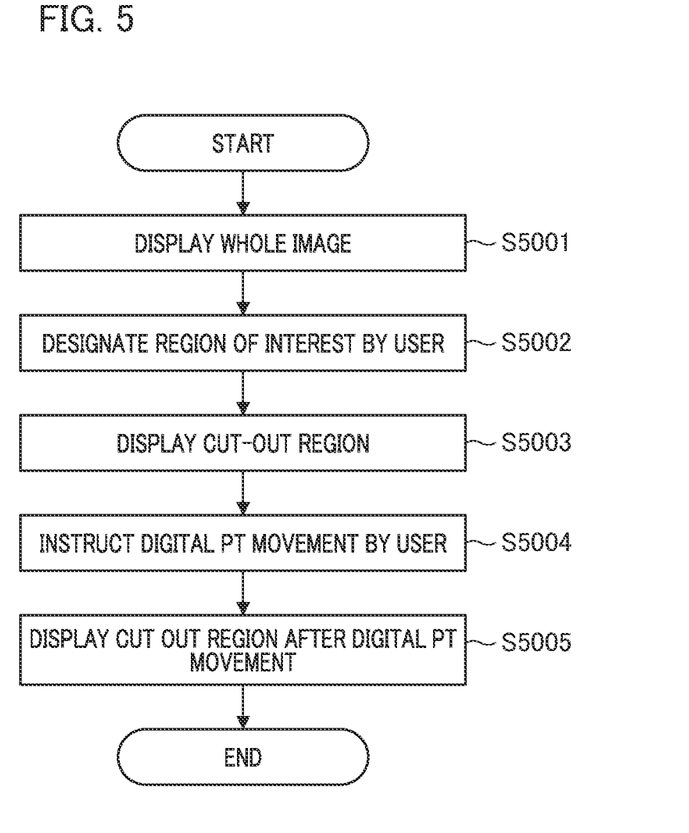
FIG. 5 is a flowchart showing an example of operations of the client from the display of the whole image to the display of the video image of the cut-out region after digital PT movement according to the first embodiment.

FIG. 5 is a flowchart showing an example of the operations of the client 104 from the display of the whole video image to the display of the video image for the cut-out region after digital PT movement according to the first embodiment. Each process (step) in the drawing may be executed by a CPU built in the client 104.

First, the system control unit 1103 of the client 104 transmits a request for acquiring the image 106 (video image A11), which is the whole video image, to the recording server 103. Upon receipt of the video image acquisition request via the communication unit 1303, the system control unit 1301 of the recording server 103 acquires the image 106, which is the whole video image of the layer 1 from the recording unit 1302 and transmits the image 106 to the client 104. Upon receipt of the image 106 via the communication unit 1101, the system control unit 1103 of the client 104 causes the display unit 1102 to display the whole video image (S5001).

Subsequently, for example, when the user designates (sets) an area 301 of the image 106 as a region of interest (S5002), the system control unit 1103 determines whether or not the area 301 is contained within one tile of each layer. The system control unit 1103 requests a tile video image having a higher resolution from among the tile video images within which the whole predetermined region of interest (in this case, area 301) is contained, from the recording server 103 via the communication unit 1101.

Preferably, the system control unit 1103 requests a tile video image having the highest resolution from among the tile video images within which the whole predetermined region of interest is contained, from the recording server 103. In other words, the system control unit 1103 requests a tile video image on the layer having the highest layer number contained in one tile from the recording server 103 via the communication unit 1101.

Upon receipt of the video image acquisition request from the client 104 via the communication unit 1303, the system control unit 1301 of the recording server 103 acquires a tile video A37 from the recording unit 1302 and transmits it to the client 104. Upon receipt of the tile video image A37 via the communication unit 1101, the system control unit 1103 cuts out the area 301 from the tile video image A37 and causes the display unit 1102 to display it (S5003).

Next, when the user instructs digital PT movement by preset movement or the like (S5004), the system control unit 1103 of the client causes the display unit 1102 to display the video image that has been cut out from the tile video image A37 while the region of interest is being contained in the tile video image A37. The details of preset movement will be described below.

However, at the stage when an adjacent tile video image is also required for cutting out the region of interest, as in an area 302, due to digital PT movement, the system control unit 1103 requests the tile video image A37 and the tile video image A38 from the recording server 103 via the communication unit 1101. Upon receipt of the video image acquisition request via the communication unit 1303, the system control unit 1301 of the recording server 103 attempts to transmit the tile video image A37 and the tile video image A38 from the recording unit 1302 to the client 104.

However, if the tile video image A38 at the timing of transmission is an inter-frame compressed video image, the tile video image A38 cannot be displayed on the client 104. Hence, the system control unit 1301 acquires only the tile video image A37 from the recording unit 1302 and transmits it to the client 104 via the communication unit 1303. Here, the system control unit 1301 may provide a notification indicating that only the tile video image A37 is being transmitted to the client 104.

Subsequently, at the timing when the tile video image A38 becomes an intra-frame compressed video image, the system control unit 1301 transmits the tile video image A38 to the client 104 via the communication unit 1303.

Upon receipt of only the tile video image A37 via the communication unit 1101, the system control unit 1103 cuts out the region closest to the area 302 from the tile video image A37 and causes the display unit 1102 to display the region closest to the area 302. Subsequently, upon receipt of the tile video image A37 and the tile video image A38 via the communication unit 1101, the system control unit 1103 cuts out the area 302 from the tile video image A37 and the tile video image A38 and causes the display unit 1102 to display the cut-out area 302 (S5005).

As described above, when the user moves the region of interest by digital PT movement including preset movement or the like, the tile video images to be displayed on the display unit 1102 must be switched frequently. However, there is a drawback in which the region designated by the user cannot be displayed until the timing when the video image becomes the intra-frame compressed video image.

In the embodiments below, the time required for display of the region of interest during preset movement is reduced by requesting a tile video image including a region of interest to be registered during preset registration.

Figure 6A:
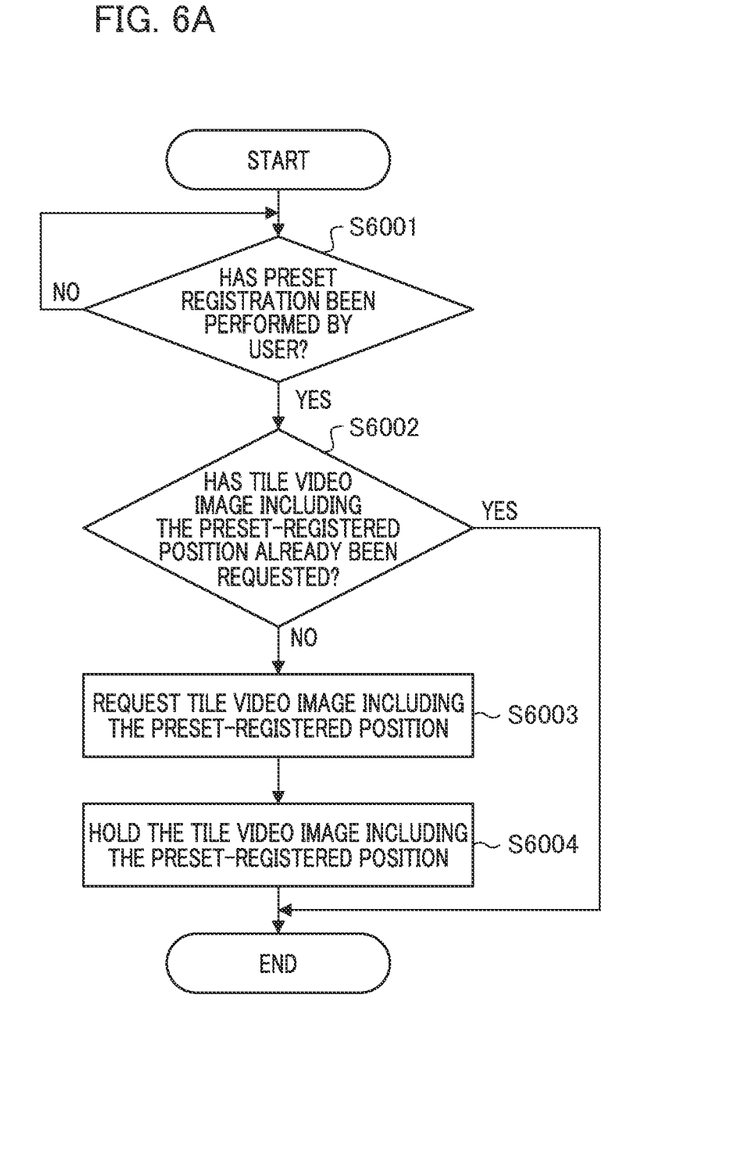
FIGS. 6A, 6B, and 6C are flowcharts showing display processing for a region to which preset registration has been performed according to the first embodiment.
Figure 6B:
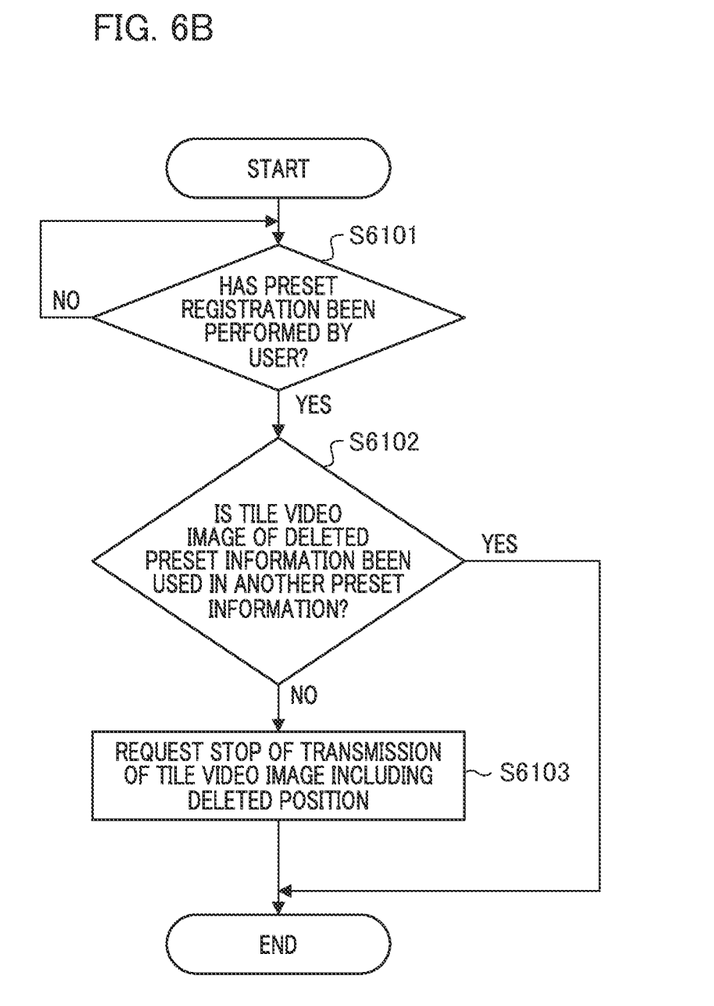
Figure 6C:
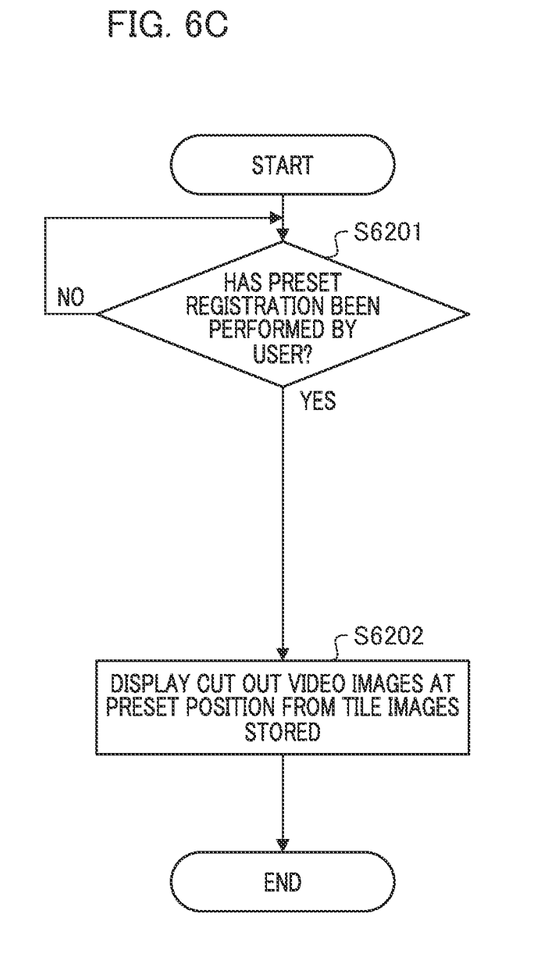

The flow of the first embodiment will be described below with reference to FIG. 3, FIG. 4, FIG. 6, and FIG. 7. FIG. 6 is a flowchart showing display processing for the region for which preset registration has been performed according to the first embodiment.

Each step in the drawing may be executed by a CPU built in the client 104. The flowchart shows the operations of the client 104 when the information related to the region of interest designated in advance by the user is registered and deleted, and when the registered region of interest is invoked, that is, when preset movement is performed.

Note that, in the present embodiment, designating the region of interest by the user in advance is referred to as "preset", and registering the preset information is referred to as "preset registration". Additionally, changing (moving) an image to be displayed by the display unit 1102 to an image of preset region of interest and changing (moving) an image to be displayed by the display unit 1102 to an image of preset region of interest, which is different from a preset region of interest that is being currently displayed by the display unit 1102, are both referred to as "preset movement".

Figure 7:
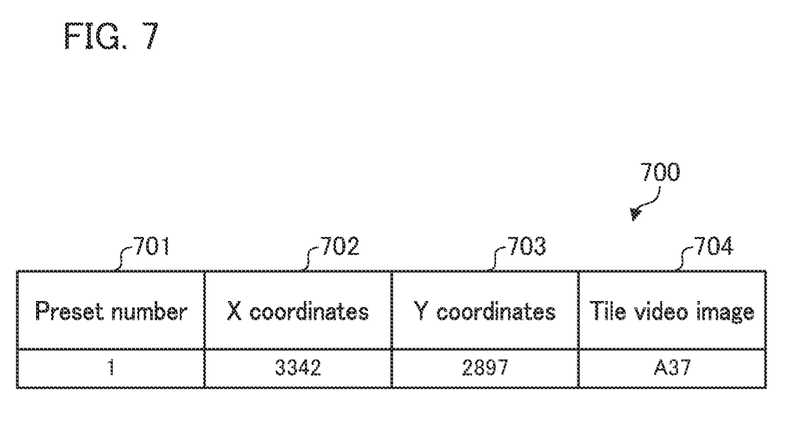
FIG. 7 illustrates an example of preset information to be transmitted from a client to the recording server when a user performs preset registration according to the first embodiment.

FIG. 7 illustrates an example of the preset information to be transmitted from the client 104 to the recording server 103 when the user performs preset registration.

FIG. 6A is a flowchart showing the case when the user performs preset registration. First, in S6001, the user operates the input unit 1104, designates a position (region) on the picked-up image for which the user wishes to perform preset registration, and makes the display unit 1102 display the position (region).

For example, when the user designates the area 301 as a region for which the user wishes to perform preset registration, the system control unit 1103 determines whether or not the region of the area 301 is contained in one tile of each layer. The system control unit 1103 requests the recording server 103 to transmit a tile of the largest layer that can be contained in one tile (in this case, tile video image A37) via the communication unit 1101.

Upon receipt of the video image acquisition request via the communication unit 1303, the system control unit 1301 of the recording server 103 acquires the tile video A37 from the recording unit 1302 and transmits it to the client 104. Upon receipt of the tile video image A37 via the communication unit 1101, the system control unit 1103 cuts out the area 301 from the tile video image A37 and causes the display unit 1102 to display the cut-out area 301.

When the user inputs a setting for preset registration for the area 301 that is being currently displayed via the input unit 1104, the system control unit 1103 provides a notification about preset information 700 shown in FIG. 7 to the recording server 103 via the communication unit 1101.

Here, the preset information indicating "1" as preset number 701, "3342" as an X coordinate 702 of the area 301, "2897" as a Y coordinate 703 of the area 301, and "A37" as a tile video image 704 including the area 301 is transmitted. That is, the preset information includes a preset number, the position coordinates of the region of interest for which preset registration has been performed, a number of tile video image which includes the region of interest for which preset registration has been performed, and the like.

Subsequently, when the recording server 103 receives the preset information 700 via the communication unit 1303, the system control unit 1301 stores this information in the recording unit 1302. Holding (storing) the preset information in the recording server 103 leads to sharing the preset information among a plurality of clients.

Next, the system control unit 1103 confirms whether or not the tile video image A37 including the positions of the coordinates 702 and 703 of the preset information 700 registered in S6001 has already been requested from the recording server 103 (S6002). In S6002, if the tile video image A37 has already been requested from the recording server 103, the flow ends.

In S6002, if the request for the tile video image A37 has not yet been performed to the recording server 103, the system control unit 1103 requests the tile video image A37 from the recording server 103 via the communication unit 1101. When the recording server 103 receives the request for the tile video image A37 via the communication unit 1303, the system control unit 1301 acquires the tile video image A37 from the recording unit 1302 and transmits it to the client 104. Subsequently, the system control unit 1301 continues to transmit the tile video image A37 until the stop of transmission of the tile video image A37 is requested from the client 104 (S6003).

Upon receipt of the tile video image A37 transmitted from the recording server 103 via the communication unit 1101, the system control unit 1103 holds the data of the tile video image A37 in the system control unit 1103 (S6004).

Next, a flowchart showing the case when the user deletes (cancels) the region of interest for which preset registration has been performed will be described, with reference to FIG. 6B. First, in S6101, the user operates the input unit 1104 and selects preset information which the user wishes to delete.

For example, when the user deletes the preset number 1, the system control unit 1103 transmits a request for deletion of the preset number 1 to the recording server 103 via the communication unit 1101. When receiving the request for deletion of the preset number 1 via the communication unit 1303, the system control unit 1301 of the recording server 103 deletes the preset number 1 from the preset information stored in the recording unit 1302.

Next, the system control unit 1103 confirms whether or not the tile video image A37 including the position coordinates of the preset number 1, which is deleted in S6101, is used in another preset (S6102).

In S6102, if the tile video image A37 of the preset information 1 is used in another preset (Yes), the flow ends.

In S6102, when the tile video image A37 of the preset information 1 is not used in another preset (No), the system control unit 1103 requests the stop of transmission of the tile video image A37 for preset from the recording server 103 via the communication unit 1101. When the recording server 103 receives the request for the stop of transmission of the tile video image A37 via the communication unit 1303, the system control unit 1301 stops the transmission of the tile video image A37 (S6103).

Next, a flowchart showing the case when the user performs preset movement will be described, with reference to FIG. 6C. First, in S6201, the user operates the input unit 1104 and selects preset information to be a movement destination. For example, it is assumed that the user selects the preset information 1 as a movement destination. In this case, the system control unit 1103 cuts out the area 301 from the tile video image A37 that corresponds to the position coordinates of the preset information 1 that has already been held in the system control unit 1103 and causes the display unit 1102 to display it (S6202).

As described above, in the case in which the preset registration has been performed, the high-resolution tile video image of the region for which preset registration has been performed is also received, in addition to the tile video image of the region that is being currently displayed. Therefore, it is possible to display high-resolution images without interruption during preset movement.

Second Embodiment

In the first embodiment, the display without interruption during preset movement can be achieved by receiving tile video images of all the regions of interest for which preset registration has been performed, in addition to the tile video images of the region of interest that is being currently displayed. However, the constant reception of the high-resolution tile video images of all the regions of interest for which preset registration has been performed may increase the amount of the bandwidth consumed. Accordingly, in the present embodiment, a method for stopping the transmission of high-resolution tile video images according to the operation state will be described.

Figure 8A:
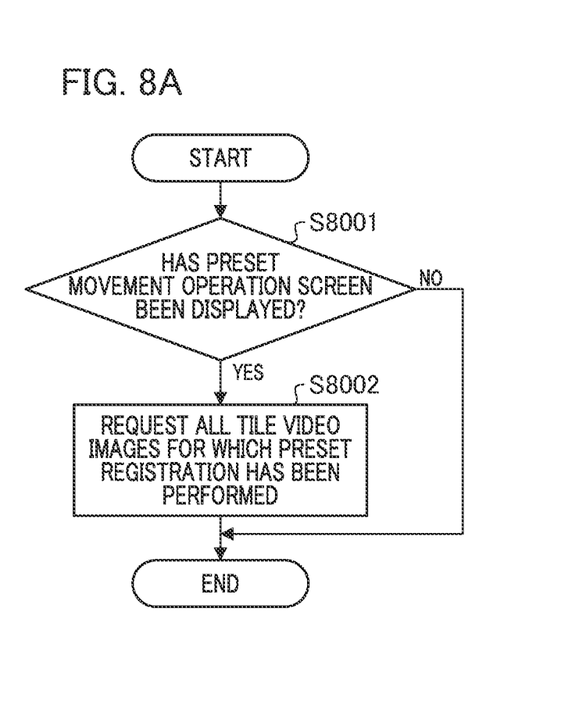
FIGS. 8A and 8B are flowcharts showing display processing for a region to which preset registration has been performed according to the second embodiment.
Figure 8B:
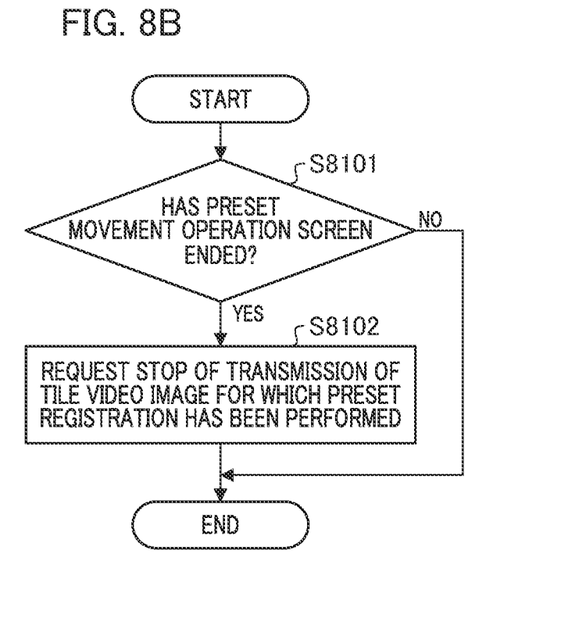

The second embodiment will be described below with reference to the accompanying drawings. A flow in the second embodiment will be described below with reference to FIG. 3, FIG. 4, and FIG. 8. FIGS. 8A and 8B are flowcharts showing display processing for the region for which preset registration has been performed according to the second embodiment.

FIG. 8A is a flowchart showing the operations of the client 104 when the user makes a preset movement operation screen (change operation screen) display. FIG. 8B is a flowchart showing the operations of the client 104 when the user ends the preset movement operation screen.

The flow in FIG. 8A will be described. In S8001, the user operates the input unit 1104 to make an operation screen for selecting a movement destination for preset movement display. Subsequently, the system control unit 1103 causes the display unit 1102 to display the preset movement operation screen.

Subsequently, in S8002, the system control unit 1103 requests the transmission of the tile video images included in all the registered preset information from the recording server 103 via the communication unit 1101. When the recording server 103 receives the request for the transmission of all the tile video images included in the registered preset information via the communication unit 1303, the system control unit 1301 acquires all the tile video images requested from the recording unit 1302 and transmits them to the client 104. The system control unit 1301 continues to transmit the tile video images until the stop of transmission of the tile video images included in the registered preset information is requested from the client 104.

Next, the flow in FIG. 8B will be described. In S8101, the user operates the input unit 1104 to end the operation screen for selecting preset movement and performs the operation to display a different screen. Subsequently, the system control unit 1103 ends the preset movement operation screen and causes the display unit 1102 to display a screen that is different from the preset movement operation screen.

In S8102, the system control unit 1103 requests the stop of transmission of the tile video images included in the registered preset information from the recording server 103 via the communication unit 1101. When the recording server 103 receives the request for stopping the transmission of the tile video images included in the registered preset information via the communication unit 1303, the system control unit 1301 stops the transmission of the tile video images.

At this time, there are cases in which the region of interest selected by preset movement continues to be displayed on the display unit 1102. In this kind of case, the system control unit 1103 requests the stop of transmission of tile video images, which are other than the tile video images including the region of interest selected by preset movement, from among the tile video images included in the registered preset information.

As described above, the high-resolution tile video images for preset are transmitted only during the period of time of the display of the screen for selecting preset movement. Accordingly, it is possible to display the high-resolution images without interruption during preset movement while reducing the amount of bandwidth consumed during the time when preset movement is not performed.

In the present embodiment, although the time period of the transmission of the tile video images included in all the registered preset information is limited to the time period of displaying the operation screen for selecting preset movement so as to eliminate unnecessary bandwidth consumption, the elimination of unnecessary bandwidth consumption may be realized by another method. For example, if the client 104 and the recording server 103 can execute preset tour, in S8001 of FIG. 8A, the timing at which a preset tour execution operation screen is displayed may be used, instead of the timing at which the user makes the preset movement operation screen display. In this context, the preset tour means causing the display unit 1102 to display video images of the regions designated in advance on the picked-up image for a predetermined time and in order designated in advance.

At this time, in S8002, it is sufficient to request the tile video image of the preset information included in the preset tour from the recording server 103, instead of requesting the transmission of all the tile video images included in the registered preset information. In S8101 of FIG. 8B, the timing at which the preset tour stops may be used, instead of the timing at which the user ends the preset movement operation screen. At this time, in S8102, it is sufficient to request the stop of transmission of the tile video images of the preset information included in the preset tour.

Additionally, in the preset tour, the order of the regions of interest to be displayed by the display unit 1102 and the time are determined in advance. Accordingly, for example, the transmission or the stop of transmission of the tile video images may be requested based on the designated order and time, during the execution of preset tour. Specifically, it is assumed that the preset tour is set so that tour is performed in the order of, for example, preset information 1, preset information 2, and preset information 3.

In this case, for example, at the timing when the preset tour execution operation screen is displayed, the transmission of the tile images included in the preset information 1 and the preset information 2 are requested to the recording server 103. During the execution of preset tour, the system control unit 1103 transmits a request for stopping the transmission of the tile video images of the preset information 1 to the recording server 103 at the timing of moving from the region of interest of the preset information 1 to the region of interest of the preset information 2. Subsequently, the transmission of the tile video image of the preset information 3, which is the next order of the preset information 2, is requested to the recording server 103. This results in further reduction of the amount of bandwidth consumed.

Additionally, in the present embodiment, although the transmission of all the tile video images included in the registered preset information is requested, for example, the stop of transmission of the tile video images of the preset information that has passed a predetermined time period from the day on which preset movement was executed may be requested. In other words, the system control unit 1103 may request the recording server 103 to stop the transmission of the tile video images included in the preset information that has passed a predetermined time period after the latest display on the display unit 1102.

Further, the system control unit 1103 may request the stop transmission of the tile video images included in the preset information that has passed a predetermined time period after the registration from the recording server 103.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the information processing apparatus through a network or various storage media. Then, a computer (or a CPU, an MPU, or the like) of the information processing apparatus may be configured to read and execute the program. In such a case, the program and the storage medium storing the program configure the present invention.

This application claims the benefit of Japanese Patent Application No. 2021-092420 filed on Jun. 1, 2021, which is hereby incorporated by reference herein in its entirety.

What is claimed is:

1. An information processing apparatus that can communicate with a storage device that stores, at a plurality of resolutions, tile images obtained by dividing a picked-up image into a plurality of predetermined regions and to which encoding processing including intra-frame encoding and inter-frame encoding has been performed, the information processing apparatus comprising:
   at least one processor or circuit configured to function as:
      a designation unit configured to designate predetermined regions of the picked-up image for a preset tour in advance;
      a request unit configured to request transmission of all of the tile images including the predetermined regions with a higher resolution than a resolution of the picked-up image from the storage device; and
      a display control unit configured to cause the display unit to display each of the predetermined regions for a predetermined time and in an order designated in advance so as to execute the preset tour; and
   wherein the display control unit can cause the display unit to display a user interface screen for operating the preset tour that performs tour by designating the order of the predetermined regions in advance,
   wherein in response to a timing when the user interface screen for operating the preset tour is displayed, the request unit requests the storage device to transmit all of the tile images including the predetermined regions for the preset tour before the preset tour is started, so that a high resolution image can be displayed quickly for each of the predetermined regions for the preset tour.

2. The information processing apparatus according to claim 1,
   wherein in a case where the designation of the predetermined region is canceled by the designation unit, the request unit requests the storage device to stop the transmission of the tile image including the canceled predetermined region.

3. The information processing apparatus according to claim 2,
   wherein in a case where the tile image including the canceled predetermined region includes another predetermined region, which is different from the cancelled predetermined region, the request unit does not request the storage device to stop the transmission of the tile image including the cancelled predetermined region.

4. The information processing apparatus according to claim 1,
   wherein if the user interface screen for operating the preset tour ends, the request unit requests the storage device to stop the transmission of the tile image including the predetermined region or to stop the transmission of a tile image that is other than the tile image including the predetermined region selected on the user interface screen.

5. The information processing apparatus according to claim 1, wherein if an operation for stopping the preset tour is performed, the request unit requests the storage device to stop the transmission of the tile image including the predetermined region included in the preset tour.

6. The information processing apparatus according to claim 5,
wherein the request unit requests the storage device to transmit or stop the transmission of the tile image including the predetermined region based on the order and time designated in the preset tour, during execution of the preset tour.

7. The information processing apparatus according to claim 1,
wherein the request unit requests the storage device to stop the transmission of the tile image including the predetermined region for which a predetermined time period has elapsed after the latest display on the display unit.

8. The information processing apparatus according to claim 1,
wherein the request unit requests the storage device to stop the transmission of the tile image including the predetermined region for which a predetermined time period has elapsed after the predetermined region is designated.

9. The information processing apparatus according to claim 1,
wherein the request unit requests the storage device to transmit a tile image having the highest resolution from among tile images including the whole predetermined region.

10. A control method of an information processing apparatus that can communicate with a storage device that stores, at a plurality of resolutions, tile images obtained by dividing a picked-up image into a plurality of predetermined regions and to which encoding processing including intra-frame encoding and inter-frame encoding has been performed, the control method comprising:
designating predetermined regions of the picked-up image for a preset tour in advance;
requesting the storage device to transmit all of the tile images including the predetermined regions with a higher resolution than a resolution of the picked-up image; and
display each of the predetermined regions for a predetermined time and in an order designated in advance so as to execute the preset tour; and
wherein the display unit is caused to display a user interface screen for operating the preset tour that performs tour by designating the order of the predetermined regions in advance,
wherein in response to a fact at which the user interface screen for operating the preset tour is displayed, the storage device is requested to transmit the tile images including the predetermined regions for the preset tour before the preset tour is started, so that a high resolution image can be displayed quickly for each of the predetermined regions for the preset tour.

11. A non-transitory computer-readable storage medium configured to store a computer program to control an information processing apparatus,
the information processing apparatus being communicable with a predetermined storage device, the predetermined storage device storing, at a plurality of resolutions, tile images obtained by dividing a picked-up image into a plurality of predetermined regions and to which encoding processing including intra-frame encoding and inter-frame encoding has been performed, and
the computer program comprising the steps of:
designating predetermined regions of the picked-up image for a preset tour in advance;
requesting the storage device to transmit all of the tile images including the predetermined regions with a higher resolution than a resolution of the picked-up image; and
display each of the predetermined regions for a predetermined time and in an order designated in advance so as to execute the preset tour; and
wherein the display unit is caused to display a user interface screen for operating the preset tour that performs tour by designating the order of the predetermined regions in advance,
wherein in response to a fact at which the user interface screen for operating the preset tour is displayed, the storage device is requested to transmit the tile images including the predetermined regions for the preset tour before the preset tour is started, so that a high resolution image can be displayed quickly for each of the predetermined regions for the preset tour.

12. An image pickup system including an image pickup apparatus that generates tile images obtained by dividing a picked-up image into a plurality of predetermined regions and to which encoding processing including intra-frame encoding and inter-frame encoding has been performed, a storage device that stores the processed tile images at a plurality of resolutions, and an information processing apparatus that can communicate with the storage device,
the information processing apparatus comprising:
at least one processor or circuit configured to function as:
a designation unit configured to designate predetermined regions of the picked-up image for a preset tour in advance;
a request unit configured to request the storage device to transmit the tile image including the predetermined regions with a higher resolution than a resolution of the picked-up image; and
a display control unit configured to cause the display unit to display each of the predetermined regions for a predetermined time and in an order designated in advance so as to execute the preset tour; and
wherein when causing the display unit to display, the display unit is caused to display a user interface screen for operating the preset tour that performs tour by designating the order of the predetermined regions in advance,
wherein in response to a fact at which the user interface screen for operating the preset tour is displayed, the storage device is requested to transmit all of the tile images including the predetermined regions for the preset tour before the preset tour is started, so that a high resolution image can be displayed quickly for each of the predetermined regions for the preset tour.

* * * * *